US008457935B2

(12) United States Patent
Inada

(10) Patent No.: US 8,457,935 B2
(45) Date of Patent: Jun. 4, 2013

(54) DATA PROCESSING METHOD FOR SAMPLING DATA FROM SETS OF ORIGINAL DATA

(75) Inventor: Yoshie Inada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 12/610,595

(22) Filed: Nov. 2, 2009

(65) Prior Publication Data

US 2010/0138637 A1 Jun. 3, 2010

(30) Foreign Application Priority Data

Nov. 28, 2008 (JP) ................................ 2008-303350

(51) Int. Cl.
*G06G 7/56* (2006.01)
(52) U.S. Cl.
USPC ............................................ 703/5; 382/232
(58) Field of Classification Search
USPC .............................................. 703/5; 382/232
See application file for complete search history.

(56) References Cited

U.S. PATENT DOCUMENTS

| 5,596,659 | A * | 1/1997 | Normile et al. | 382/253 |
|---|---|---|---|---|
| 6,098,082 | A * | 8/2000 | Gibbon et al. | 715/202 |
| 6,677,961 | B1 * | 1/2004 | Bhat | 715/723 |
| 6,937,773 | B1 * | 8/2005 | Nozawa et al. | 382/243 |
| 2005/0147187 | A1 | 7/2005 | Mori | 375/324 |
| 2006/0233446 | A1 | 10/2006 | Saito et al. | 382/232 |
| 2009/0022416 | A1 * | 1/2009 | Kirenko et al. | 382/264 |

FOREIGN PATENT DOCUMENTS

| JP | 10-312152 | 11/1998 |
|---|---|---|
| JP | 2005-78555 | 3/2005 |
| JP | 2005-198266 | 7/2005 |
| JP | 2006-303690 | 11/2006 |
| JP | 2007-6385 | 1/2007 |

OTHER PUBLICATIONS

Nasser M. Nasrabadi et al., "Hierarchical block truncation coding of digital HDTV images," 1990, IEEE Transactions on Consumer Electronics, vol. 36, No. 3, pp. 254-261.*
Ricardo A. F. Belfor et al., "Spatially adaptive subsampling of image sequences," 1994, IEEE Transactions on Image Processing, vol. 3, No. 5, pp. 492-500.*
Tallat Mahmood Shafaat, "Context dependent compression using adaptive subsampling of scientific datasets," 2006, Master of Science Thesis, Stockholm Sweden, 54 pages.*

(Continued)

*Primary Examiner* — Dwin M Craig
*Assistant Examiner* — Russ Guill
(74) *Attorney, Agent, or Firm* — Staas & Halsey LLP

(57) ABSTRACT

A data processing method for sampling data from data each varying over time, each of the data being associated with each of grid points arranged in an area, the method includes: dividing the area into blocks; calculating a variation rate of each of the data associated with each of the grid points included in each of the blocks; dividing the blocks into sub-blocks in accordance with the variation rate of the blocks; calculating a variation rate of each set of the data associated with each of the grid points included in each of the sub-blocks; and determining a frequency of sampling data associated with each of the grid points for the sub-blocks of the blocks and for the rest of the blocks in accordance with the variation rate of the sub-blocks and the rest of the blocks.

20 Claims, 12 Drawing Sheets

OTHER PUBLICATIONS

Ye-Kui Wang et al., "Block truncation coding with adaptive decimation and interpolation," 2000, Visual Communications and Image Processing 2000, pp. 430-437.*

L.A. Barba et al., "Numerical investigations on the accuracy of the vortex method with and without remeshing," 2003, AIAA Computational Fluid Dynamics Conference, pp. 1-11.*

G. Brethouwer, "The effect of rotation on rapidly sheared homogeneous turbulence and passive scalar transport. Linear theory and direct numerical simulation," 2005, Journal of Fluid Mechanics, vol. 542, pp. 305-342.*

Huihui Bai et al., "Multiple description video coding using adaptive temporal subsampling," 2007, 2007 IEEE International Conference on Multimedia and Expo, pp. 1331-1334.*

S. Sabri et al., "Coding of video signals at 50 Kb/s using motion compensation techniques," 1983, Military Communications Conference 1983, pp. 809-816.*

Christopher Cramer et al., "Low bit-rate video compression with neural networks and temporal subsampling," 1996, Proceedings of the IEEE, vol. 84, No. 10, pp. 1529-1543.*

Han-Wei Shen et al., "A fast volume rendering algorithm for time-varying fields using a time-space partitioning (TSP) tree," 1999, Proceedings Visualization 1999, 7 pages.*

George C. Polyzos, "Hierarchical coding of images and continuous media for transmission over packet-switching networks," 1993, UCSD Technical report, pp. 1-16.*

P.W.M. Tsang, "Near-computation-free image encoding scheme based on adaptive decimation," Feb. 14, 2008, IET Image Processing, vol. 2, No. 4, pp. 175-184.*

M. Berzins et al., "Developing software for time-dependent problems using the method of lines and differential-algebraic integrators," 1989, Applied Numerical Mathematics, vol. 5, pp. 375-397.*

* cited by examiner

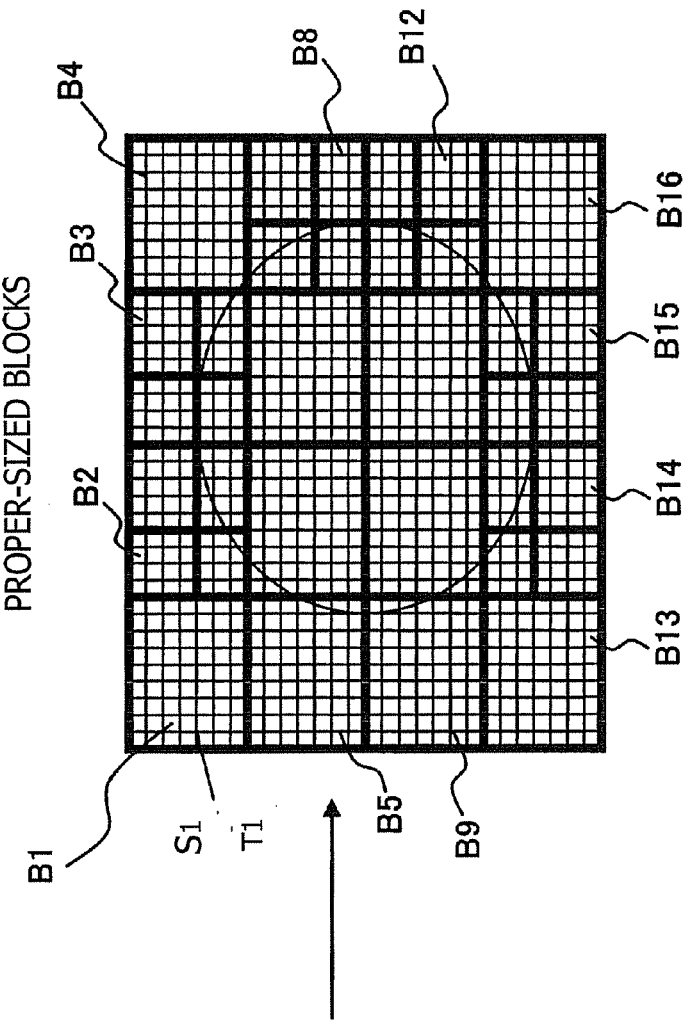
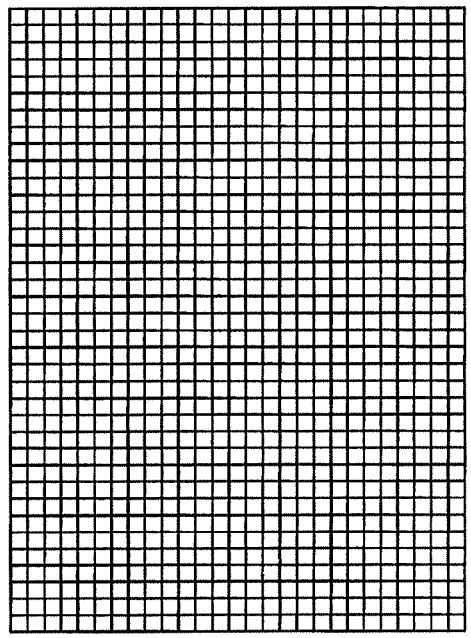
FIG. 4

FIG. 8

| BLOCK ID | GRID POINTS | PHYSICAL QUANTITY | AVERAGE VARIATION RATE | STORAGE INTERVAL | AMOUNT OF STORAGE DATA |
|---|---|---|---|---|---|
| 1 | 4 | 4 | | 1.0 | 4 |
| 2 | 4 | 4 | | 1.0 | 4 |
| 3 | 4 | 4 | | 1.0 | 4 |
| 4 | 4 | 4 | | 1.0 | 4 |
| 5 | 4 | 4 | | 1.0 | 4 |
| 6 | 4 | 4 | | 1.0 | 4 |
| 7 | 4 | 4 | | 1.0 | 4 |
| 8 | 4 | 4 | | 1.0 | 4 |
| 9 | 4 | 4 | | 1.0 | 4 |
| TOTAL | | | | | 36 |

FIG. 10

| BLOCK ID | GRID POINTS | PHYSICAL QUANTITY | AVERAGE VARIATION RATE | STORAGE INTERVAL | AMOUNT OF STORAGE DATA |
|---|---|---|---|---|---|
| 1 | 4 | 4 | 1/4 | 0.25 | 1 |
| 2 | 4 | 4 | 2/4 | 0.50 | 2 |
| 3 | 4 | 4 | 1/4 | 0.25 | 1 |
| 4 | 4 | 4 | 2/4 | 0.50 | 2 |
| 5 | 4 | 4 | 4/4 | 1.00 | 4 |
| 6 | 4 | 4 | 2/4 | 0.50 | 2 |
| 7 | 4 | 4 | 1/4 | 0.25 | 1 |
| 8 | 4 | 4 | 2/4 | 0.50 | 2 |
| 9 | 4 | 4 | 1/4 | 0.25 | 1 |
| TOTAL | | | | | 16 |

FIG. 12

| BLOCK ID | GRID POINTS | PHYSICAL QUANTITY | AVERAGE VARIATION RATE | STORAGE INTERVAL | AMOUNT OF STORAGE DATA |
|---|---|---|---|---|---|
| 1-1 | 1 | 1 | 0/1 | 0.00 | 0 |
| 1-2 | 1 | 1 | 0/1 | 0.00 | 0 |
| 1-3 | 1 | 1 | 0/1 | 0.00 | 0 |
| 1-4 | 1 | 1 | 1/1 | 1.00 | 1 |
| 2-1 | 1 | 1 | 0/1 | 0.00 | 0 |
| 2-2 | 1 | 1 | 0/1 | 0.00 | 0 |
| 2-3 | 1 | 1 | 1/1 | 1.00 | 1 |
| 2-4 | 1 | 1 | 1/1 | 1.00 | 1 |
| 3-1 | 1 | 1 | 0/1 | 0.00 | 0 |
| 3-2 | 1 | 1 | 0/1 | 0.00 | 0 |
| 3-3 | 1 | 1 | 1/1 | 1.00 | 1 |
| 3-4 | 1 | 1 | 0/1 | 0.00 | 0 |
| 4-1 | 1 | 1 | 0/1 | 0.00 | 0 |
| 4-2 | 1 | 1 | 1/1 | 1.00 | 1 |
| 4-3 | 1 | 1 | 0/1 | 0.00 | 0 |
| 4-4 | 1 | 1 | 1/1 | 1.00 | 1 |
| 5 | 4 | 4 | 4/4 | 1.00 | 4 |
| 6-1 | 1 | 1 | 1/1 | 1.00 | 1 |
| 6-2 | 1 | 1 | 0/1 | 0.00 | 0 |
| 6-3 | 1 | 1 | 1/1 | 1.00 | 1 |
| 6-4 | 1 | 1 | 0/1 | 0.00 | 0 |
| 7-1 | 1 | 1 | 0/1 | 0.00 | 0 |
| 7-2 | 1 | 1 | 1/1 | 1.00 | 1 |
| 7-3 | 1 | 1 | 0/1 | 0.00 | 0 |
| 7-4 | 1 | 1 | 0/1 | 0.00 | 0 |
| 8-1 | 1 | 1 | 1/1 | 1.00 | 1 |
| 8-2 | 1 | 1 | 1/1 | 1.00 | 1 |
| 8-3 | 1 | 1 | 0/1 | 0.00 | 0 |
| 8-4 | 1 | 1 | 0/1 | 0.00 | 0 |
| 9-1 | 1 | 1 | 1/1 | 1.00 | 1 |
| 9-2 | 1 | 1 | 0/1 | 0.00 | 0 |
| 9-3 | 1 | 1 | 0/1 | 0.00 | 0 |
| 9-4 | 1 | 1 | 0/1 | 0.00 | 0 |
| TOTAL | | | | | 16 |

DATA PROCESSING METHOD FOR SAMPLING DATA FROM SETS OF ORIGINAL DATA

CROSS-REFERENCE TO RELATED APPLICATION

This application is based upon and claims the benefit of priority of the prior Japanese Patent Application No. 2008-303350 filed on Nov. 28, 2008, the entire contents of which are incorporated herein by reference.

FIELD

The embodiments discussed herein are related to a spatial data processing.

BACKGROUND

Along with improvement in performance of high-end computers such as a supercomputer, large-scale application programs such as a heat conduction simulation, a typhoon simulation, and a simulation of a flow around a body have been executed at high speed and resolution.

In such a large-scale application simulation, computational results are successively output and accumulate considerably. In general, in the applications of the heat conduction simulation and the typhoon simulation, an amount of data output at each time step is calculated by "mesh size of target physical area for calculation×the number of time steps×the number of physical quantity types".

For example, provided that the mesh size of the three-dimensional area is 10,000×10,000×10,000, the number of time steps is 100,000, and 100 types of 8-byte physical quantity are set, the total size of output data equals 805 petabytes.

To store such an enormous quantity of output data, a considerable disk capacity is required. Further, such output data is input to a visualizing device (display device) and used to display a simulation process. Because of the huge data amount, a processing time necessary to display the data is increased. Thus, it is necessary to save a requisite disk capacity and in turn to reduce a visualization load by reducing output data.

As a method for reducing spatial data as above, a method for storing output data about a simulation at certain regular time-step frequency (thinning out data on a time axis), and a method for storing output data about a simulation at certain regular area frequency (thinning out data on an area axis) are proposed. These methods are discussed in Japanese Patent Application Laid-open No. 2005-198266 and Japanese Patent Application Laid-open No. 2006-303690.

SUMMARY

According to an aspect of the embodiment, a data processing method for sampling data from a plurality of sets of original data each varying over time, each of the sets of the original data being associated with each of a plurality of grid points arranged in an area, the method includes the steps of: dividing the area into a plurality of blocks evenly so that each of the blocks encloses a plurality of grid points; calculating a variation rate of each set of the original data associated with each of the grid points included in each of the blocks; dividing at least one of the blocks into a plurality of sub-blocks evenly in accordance with the variation rate of said at least one of the blocks so that each of the sub-blocks encloses at least one of the grid points; calculating a variation rate of each set of the original data associated with each of the grid points included in each of the sub-blocks; and determining a frequency of sampling data associated with each of the grid points for the sub-blocks of at least one of the blocks and for the rest of the blocks in accordance with the variation rate of the sub-blocks and the rest of the blocks.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory view of block division in FIGS. 1 and 3.

FIG. 8 is an explanatory view of storage data in block division of the first comparative example in FIG. 7.

FIG. 10 is an explanatory view of storage data in block division of the second comparative example in FIG. 9.

FIG. 12 is an explanatory view of storage data in block division according to an embodiment of the present invention as illustrated in FIG. 11.

DETAILED DESCRIPTION

Figure 1:
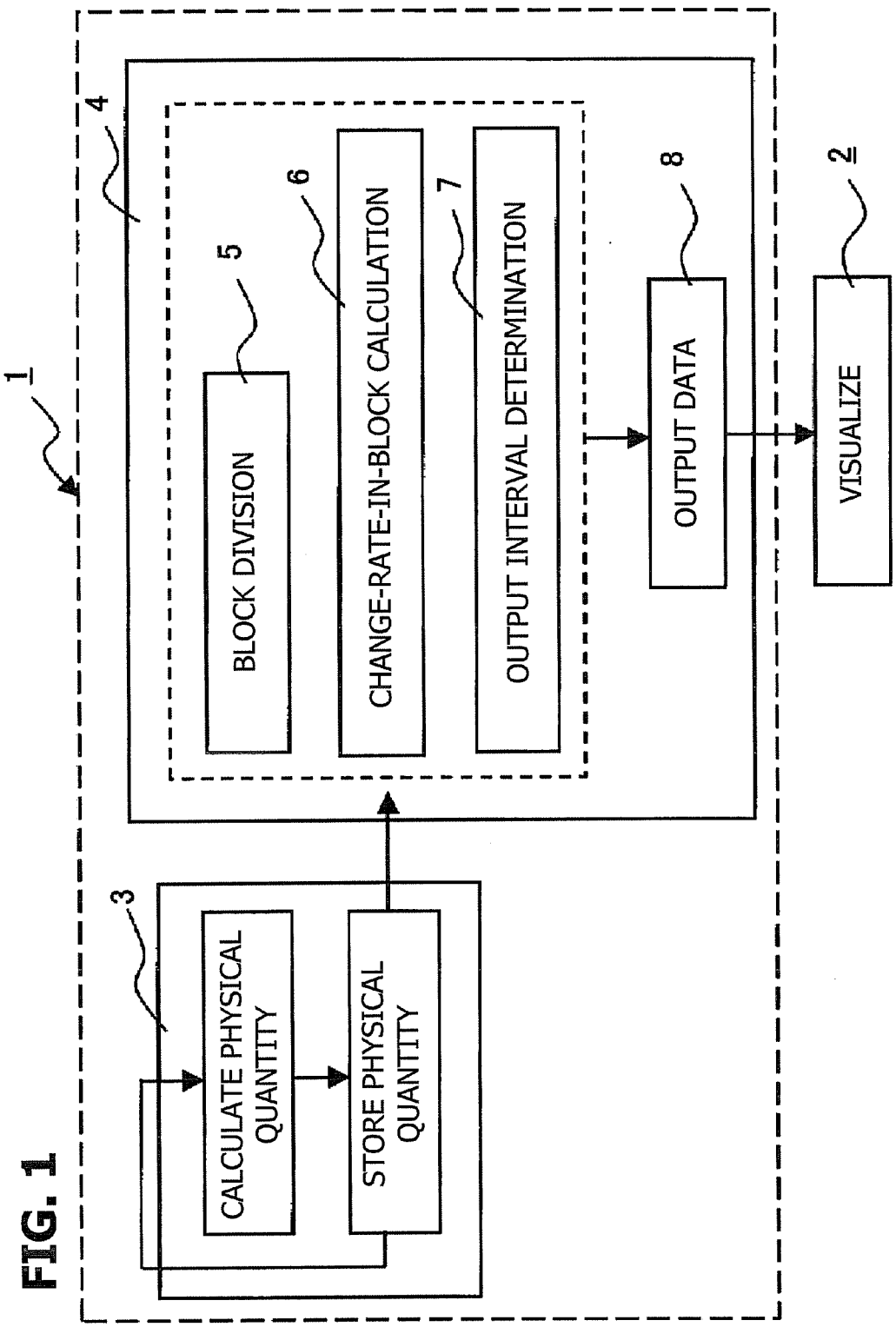
FIG. 1 is a diagram illustrating an embodiment of a data processing unit for processing spatial data.
Figure 2:
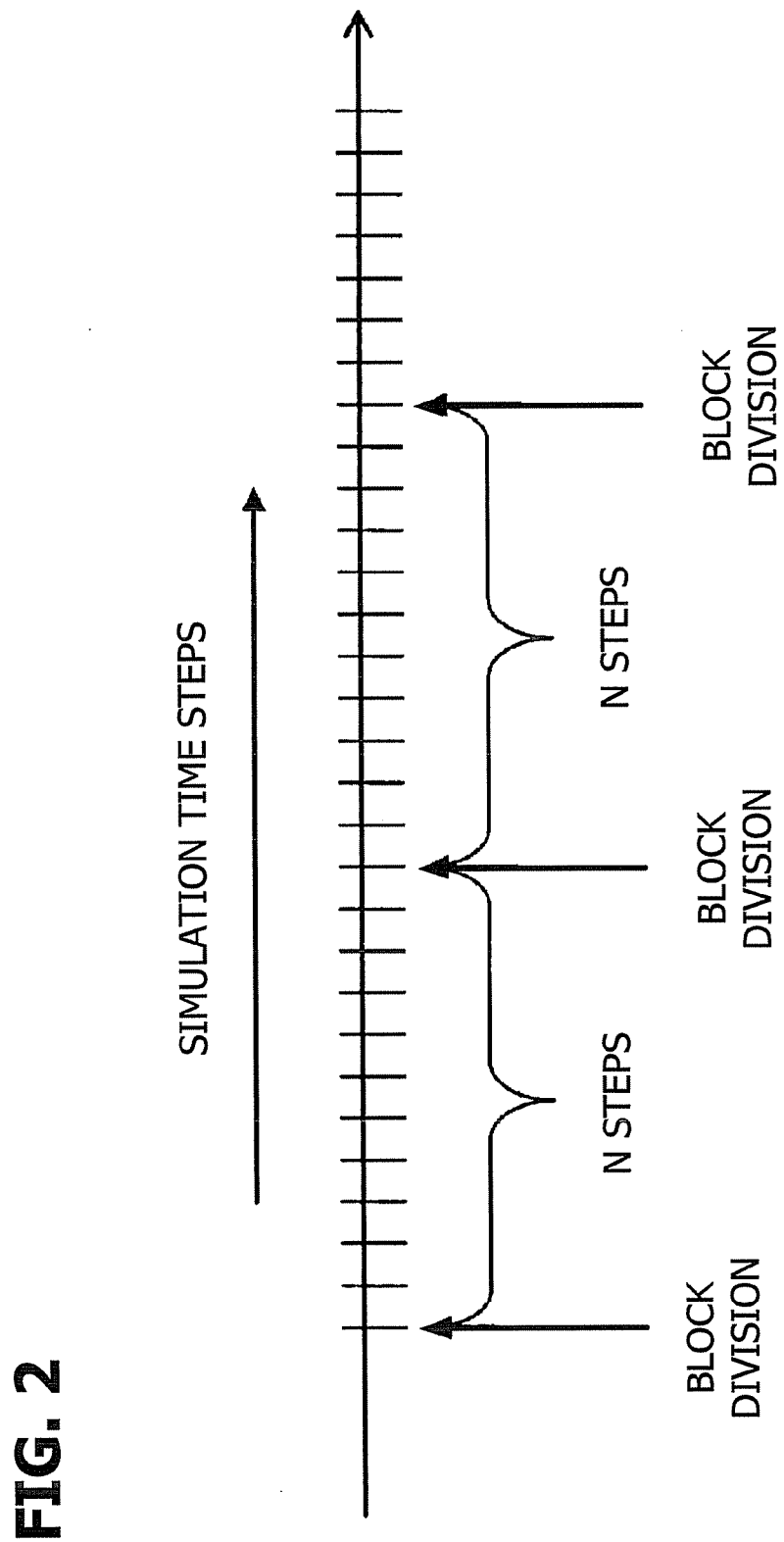
FIG. 2 is an explanatory view of time steps in a simulation program in FIG. 1.
Figure 3:
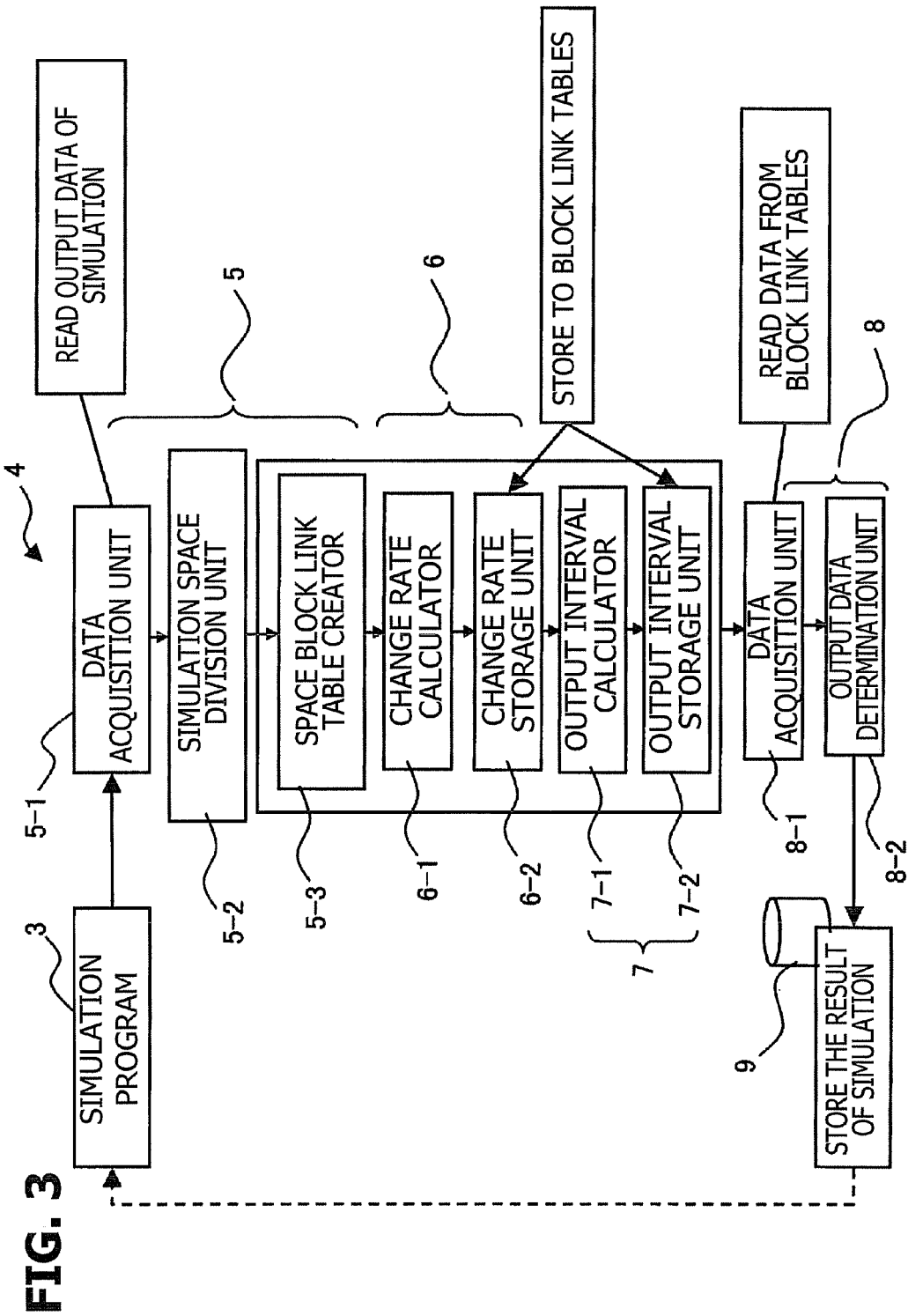
FIG. 3 is a block diagram of a data processing program in FIG. 1.
Figure 5:
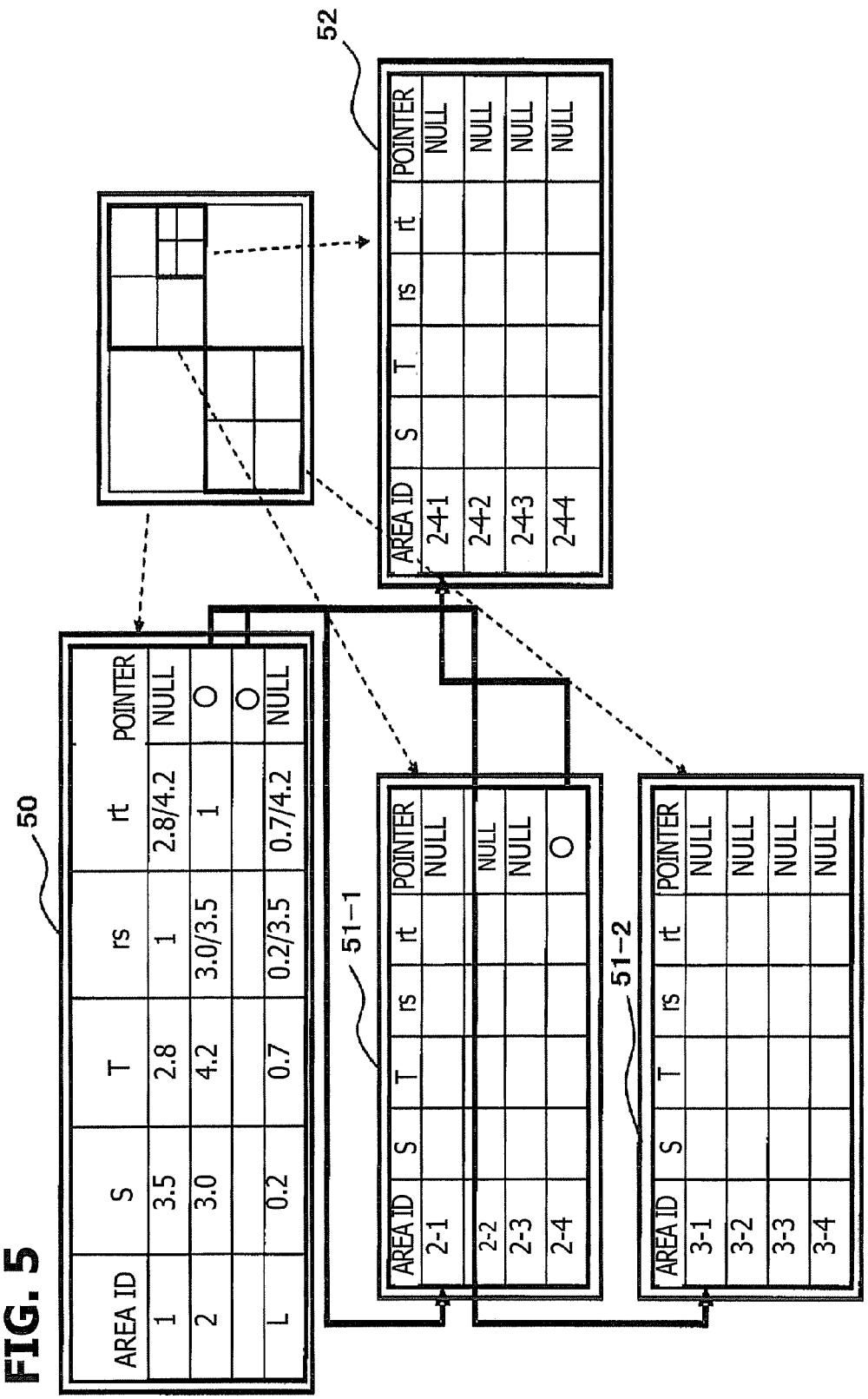
FIG. 5 is a diagram of a block link table for block division in FIG. 4.

FIG. 1 is a diagram illustrating an embodiment of a data processing unit for processing spatial data according to the present invention. FIG. 2 is an explanatory view of time steps for a simulation program in FIG. 1. FIG. 3 is a block diagram of a data processing program in FIG. 1. FIG. 4 is an explanatory view of block division in FIGS. 1 and 3. FIG. 5 is a diagram of block link table for block division in FIG. 4.

As illustrated in FIG. 1, a data processing system includes a data processing unit 1, and a visualizing device (display device) 2. The data processing unit 1 is configured by a CPU, a memory, a magnetic disk device, and other such hardware. For example, a supercomputer is suitable therefor.

The data processing unit 1 executes a simulation program 3 for a physical simulation and a data processing program 4 for data processing. As illustrated in FIG. 2, the simulation program 3 calculates a physical quantity at each of consecutive steps and temporarily stores the calculated one in a memory. The steps are referred to as simulation time steps.

For example, the simulation program 3 is a large-scale application program for a heat conduction simulation, a typhoon simulation, and a simulation of a flow around a body. The program converts a predetermined area (two-dimensional or three-dimensional) into a mesh form to calculate a physical quantity at each grid point of mesh at regular time frequency (at each step) and output time-series data about the physical quantity.

The data processing program 4 samples data from a plurality of sets of original data each varying over time. The data processing program 4 reads and executes data about the physical quantity stored on a memory by the simulation program 3. The data processing program 4 includes a block division module 5, a change-rate-in-block calculation module 6, a determination module 7, and a data output module 8 for outputting data.

The block division module 5 divides an area into a plurality of blocks evenly so that each of the blocks encloses a plurality of grid points. The change-rate-in-block calculation module 6 calculates a (time or area) variation rate of each set of the original data associated with each of the grid points included in each of the blocks. The determination module 7 determines a (time or area) output frequency of sampling data associated with each of the grid points for the sub-blocks of at least one of the blocks and for the rest of the blocks in accordance with the variation rate of the sub-blocks and the rest of the blocks.

The block division module 5 initializes a condition of dividing each of the blocks in predetermined time steps, and divides again at least one of the blocks into a plurality of sub-blocks.

The block division module 5 divides a simulation area into proper-sized blocks. The block division module 5 also divides at least one of the blocks into a plurality of sub-blocks evenly in accordance with the variation rate of at least one of the blocks so that each of the sub-blocks encloses at least one of the grid points. If each block includes grid points having an excessively large variation rate and grid points having a small variation rate in a mixed form, the module further divides each block. The change-rate-in-block calculation module 6 calculates a variation rate of each set of the original data associated with each of the grid points included in each of the sub-blocks. As illustrated in FIG. 3, the block division module 5 includes a data acquisition unit 5-1, a simulation area division unit 5-2, and an area block link table creator 5-3.

As illustrated in FIG. 4, the simulation area is expressed by grid points of the mesh. Each of a plurality of grid points correspond to a plurality of output points for simulation calculation results. Each of the sets of the original data is associated with each of the plurality of grid points arranged in the simulation area. The block division module 3 divides the simulation area into proper-sized blocks and then calculates the variation rate in physical quantity at each grid point in each block.

After that, if a target block includes both of a portion having a large variation rate in physical quantity and a portion having a small variation rate, the module further recursively divides blocks to a smaller size. As a result, a size of a block including a boundary area is reduced to downsize an area that could not be saved with a high frequency despite a large variation rate.

For example, a simulation area illustrated on the right side in FIG. 4 expresses temperature distribution at around a heat source in the case where a given point in an area is heated by the heat source. In FIG. 4, the elliptical line denotes the boundary between a high-temperature area and a low-temperature area. For example, the inside of the ellipse corresponds to the high-temperature area and the outside of the ellipse corresponds to the low-temperature area.

In the illustrated example, the simulation area is originally divided into 4×4, 16 blocks, and in some of the data processing unit 16 blocks B1 to B16, a variation rate largely differs between the inside and outside of the boundary. In such blocks (blocks B2, B3, B8, B9, B14, and B15) in FIG. 4, the area is further divided.

The operation of recursively dividing each block is repeated a certain number of times not larger than the number of times designated by a user, until a difference in variation rate is reduced.

In other words, a simulation area is uniformly divided into blocks, a variation rate in an area i at a simulation calculation point (grid point) in each block, the maximum value (Si, max) and minimum value (Si, min) of the variation rate in each block are determined. If a difference between the maximum value and the minimum value (Si, max−Si, min) is larger than a threshold value (Th) preset by a user, it is determined that an area in a target block includes a portion having a large variation rate and a portion having a small variation rate in a mixed form, and the block is further divided.

The maximum value and minimum value of the variation rate in an area of the divided block are determined, and the area is repeatedly divided a certain number of times not larger than the number of times designated by a user to generate blocks until a difference therebetween is reduced. Upon such block division, it is effective to create and manage a table.

FIG. 5 is a table (data structure) used for block division. To begin with, an area (block) ID is assigned to a preset number of areas (number of blocks) L (L>1), and an average area variation rate (S), an average time variation rate (T), a ratio of an area rate in change (rs), a ratio of a time rate in change (ts), and a cell used to determine whether an area is further divided (POINTER) are incorporated into a table 50. In the POINTER, "NULL" is set if a target block is not divided.

As described above, the maximum value (Si, max) and minimum value (Si, min) of the variation rate in the area i at the simulation calculation point in each block are calculated. As for a block with a difference between the maximum value and the minimum value (Si, max−Si, min) that is larger than the threshold value (Th) preset by a user, it is determined that an area in the block includes a portion having a large variation rate and a portion having a small variation rate in a mixed form, and the block is further divided.

In the case of dividing the block, if the simulation area thereof is a two-dimensional one, the area is further divided into four areas. If the simulation area thereof is a three-dimensional one, the area is further divided into eight areas. Then, new tables are created for storing data of each area.

FIG. 5 shows an example of a two-dimensional simulation area. A block assigned with an AREA ID of "2" in the table 50 is determined as a target block for division as a result of the aforementioned calculation, and then divided into four areas to create a link table 51-1 linked to the AREA ID=2 in the table 50. Likewise, a block assigned with an AREA ID of "3" in the table 50 is divided into four areas to create a link table 51-2 linked to the AREA ID=3 in the table 50.

Moreover, a block assigned with an AREA ID of "2-4" in the link table 51-1 is determined as a target block for division as a result of the aforementioned calculation and then divided into four areas to create a second link table 52 linked to the AREA ID=2-4 in the link table 51-1.

These link tables 51-1, 51-2, and 52 also have the same data structure as the table 50 and include an AREA ID assigned to each block, an average area variation rate (S), an average time variation rate (T), a ratio of an area rate in change (rs), a ratio of a time rate in change (ts), and a cell used to determine whether an area is further divided (POINTER).

As described above, the maximum value and minimum value of the variation rate in an area of each divided block are determined again, and the area is repeatedly divided a certain number of times not larger than the number of times designated by a user to generate blocks until a difference therebetween is reduced. Upon such block division, it is effective to create and manage a table. Following the generation of the blocks, the area variation rates in each of the blocks are averaged. In addition, the data structure applied to recursive area division is represented by link structure.

Next, the change-rate-in-block calculation module 6 in FIG. 1 calculates an average (S) of the area variation rates in each of the blocks by averaging the area variation rates (Si) at the grid points included in each of the blocks by calculation. In addition, the time variation rates (Ti) are calculated at each grid point to calculate an average (T) of the time variation rates in each of the blocks by averaging the time variation rates (T) at calculation points in each of the blocks by calculation. After that, the average values are stored in a column of an average area variation rate (S) and a column of an average time variation rate (T) in the tables 50, 51-1, 51-2, and 52 in FIG. 5.

As illustrated in FIG. 3, the change-rate-in-block calculation module 6 includes a change rate calculator 6-1 and a change rate storage unit 6-2.

Next, an output-frequency-in-block determination module 7 calculates the ratio of area variation rate (rs) and the ratio of time variation rate (rt) in the tables 50, 51-1, 51-2, and 52. In other words, a block having the larger area variation rate than any other blocks and a value thereof (maximum resolution) are extracted to output every physical quantity at each grid point in the block having the maximum area variation rate. As for the other blocks, a ratio of the maximum variation rate is set as an output frequency and stored in the ratio of area variation rate (rs) and the ratio of time variation rate (it) in the tables in FIG. 5.

As illustrated in FIG. 3, the output-frequency-in-block determination module 7 includes an output frequency calculator 7-1 and an output frequency storage unit 7-2.

For example, in the table 50, a ratio of the area variation rate in the block having the block ID=1 is "1", since the block having the maximum average area variation rate is given a block ID=1 with an average area rate=3.5. As for the other blocks, an average area variation rate (S) in each block is divided by the maximum average area variation rate (3.5), and a resultant value is set as a ratio of area variation rate and used for calculation. The ratio of area variation rate corresponds to the number of calculation points (area frequency) at which a calculation result in each block is obtained and output. So the output-frequency-in-block determination module 7 determines the area frequency of sampling data in accordance with a result of comparison among the average of the area variation rate in each of the blocks.

Likewise, in the table 50, a ratio of the time variation rate in the block having the block ID=2 is "1", since the block having the maximum average time variation rate is given a block ID=2 with an average time rate=4.2. As for the other blocks, an average time variation rate in each block is divided by the maximum average time variation rate, and a resultant value is set as a ratio of time variation rate and used for calculation. The ratio of time variation rate corresponds to a time frequency at which a calculation result in each block is obtained and output. So the output-frequency-in-block determination module 7 determines the time frequency of sampling data in accordance with a result of comparison among the average of the time variation rate in each of the blocks.

At this point, the creation of the link-structure table illustrated in FIG. 5 is completed. As described above, in order to determine an area frequency at which output data out of data about a simulation result in each block is saved (determine the number of grid points, for which a simulation result is output), the average area variation rates in the blocks are compared with each other and an output frequency for each block is determined.

More specifically, after the calculation of an average of area variation rates in all blocks, the maximum average area variation rate and a block having the maximum average area variation rate are extracted, and data in all calculation points belonging to the block are output. As for the other areas, an output frequency for each block is determined based on a ratio of the maximum average area variation rate.

Further, after the calculation of an average of time variation rates in all blocks, the maximum average time variation rate and a block having the maximum average time variation rate are extracted, and data in the block is output at each step. As for the other areas, an output frequency for each block is determined based on a ratio of the maximum average time variation rate.

Next, an output module 8 references the tables 50, 51-1, 51-2, and 52 to determine a physical quantity at each grid point data of which is output. The output module 8 includes a data acquisition unit 8-1 for reading data from the block link tables 50, 51-1, 51-2, and 52, and an output data determination unit 8-2 for selecting output data based on the read ratio of variation rate and storing the data in a magnetic disk 9.

First, the output module 8 reads the ratio of time variation rate (rt) of each block in the tables 50, 51-1, 51-2, and 52 to determine whether to display calculation points in each block.

For example, provided that an output time frequency (ratio of time variation rate) of a certain block is "0.5", and the number of simulation steps is "10", physical quantity at each grid point in the block is output at even-numbered steps and no physical quantity is output at odd-numbered steps.

To give another method, an output frequency can be determined based on a random number. For example, if the output time frequency is "0.7", and the number of simulation steps is "10", physical quantity is output at 7 steps out of 10 steps. To select 7 steps, a random number of "0-1" is set at each step, and physical quantity is output at steps having a value of the output frequency larger than the random number (output frequency rt>random number of 0 to 1).

Next, at a step where data of a target block is to be output, a ratio of area variation rate is read to determine grid points data of which is to be output based on the ratio of area variation rate. For example, if a ratio of area variation rate in a certain block is "0.5", physical quantity is output at N×0.5 grid points (½ of the number of grid points in the block) relative to the number of grid points N in the block.

As described above, it is determined which step target data is output at, based on the determined output frequency. Thus, the output step is calculated by (N/F) based on the total number of steps N and the output frequency F. For example, in the case of outputting data at the output frequency 4 (F) times out of 20 (N) steps, data is output at every 5 steps (N/F). If the total number of steps cannot be evenly divided by the output frequency, it cannot be determined which step target data is output at. Thus, the output module 8 determines time steps for processing based on the Monte Carlo method in accordance with the determined frequency of sampling data.

To elaborate, output steps are evenly divided, or a random number of 0 to 1 is set, and if a ratio of time variation rate is larger than the random number, a block at a corresponding time step is output.

Further, if a unit size of each block in the simulation area is determined, and output data at a predetermined block is selected until the end of the simulation, the blocks might not follow a spatial change accompanying a change in physical phenomenon, making it impossible to store data in an important portion. To that end, as illustrated in FIG. 2, steps (N steps) at which a block is further divided is preset by a user prior to simulation, and an area block is reconfigured at the preset simulation step frequency to generate a block, by which important data can be stored.

Figure 6:
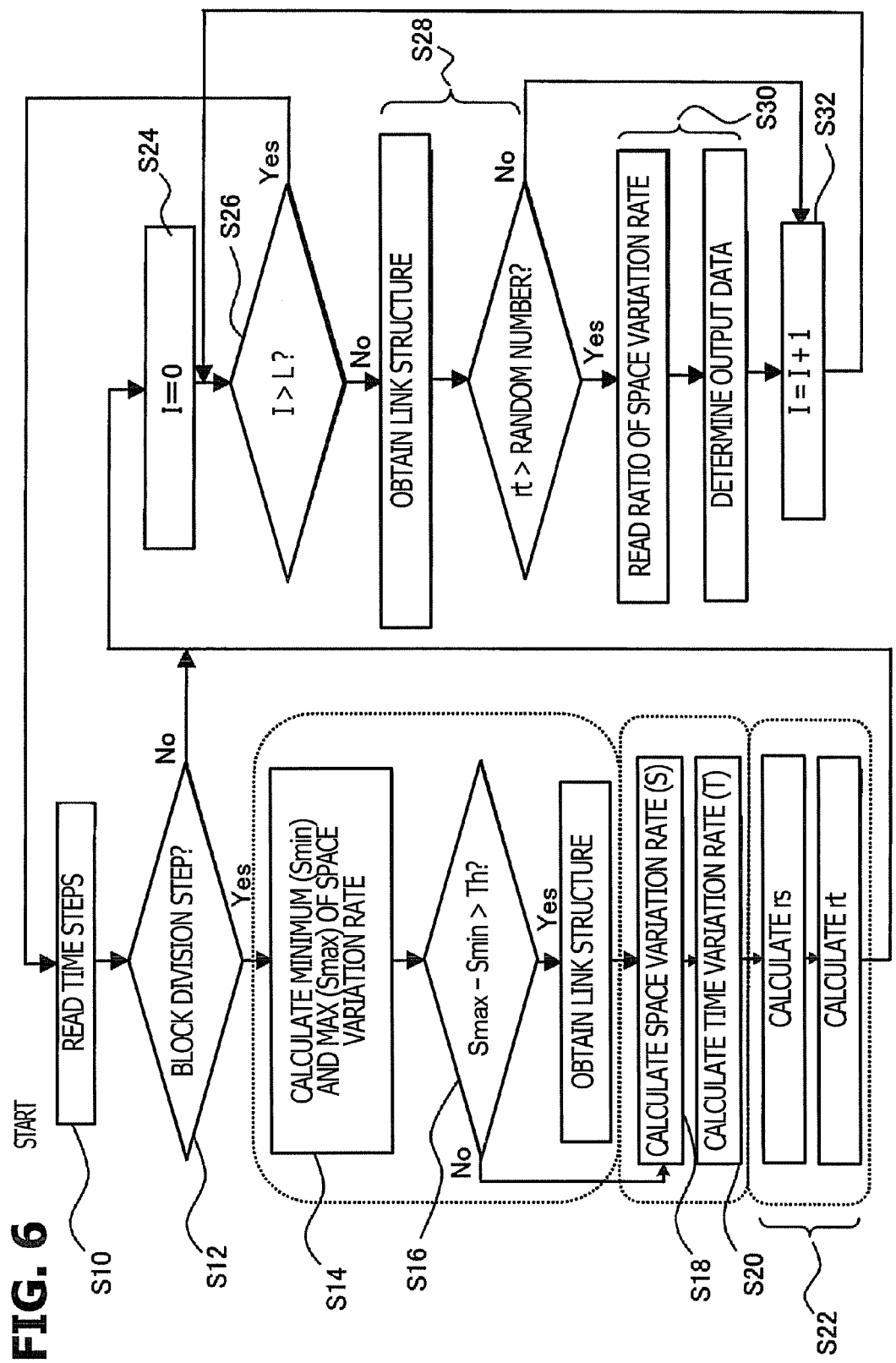
FIG. 6 is a processing flow chart of the data processing program in FIGS. 1 and 3.

FIG. 6 is a processing flow chart of the data processing program in FIGS. 1 and 3. FIGS. 7 to 12 are explanatory views thereof.

(S10) The number of time steps is read.

(S12) It is determined whether or not a current time step is a block division step based on the read number of time steps. As illustrated in FIG. 2, the block division step is a change rate calculation step, and a user sets a step frequency. For example, if 10 steps are set as the step frequency, a division step is executed every 10 steps. If a current time step is not the block division step, the processing advances to step S24.

(S14) The area variation rate Si at each grid point in a block specified by an area (block) ID is calculated based on Expression (1). Expression (1) shows an example of a three-dimensional area with coordinates of each grid point on three axes, x, y, and z, and F represents physical quantity.

$$S_i = \frac{\left\{\frac{F(x+\Delta x) - F(x)}{\Delta x} + \frac{F(y+\Delta y) - F(y)}{\Delta y} + \frac{F(z+\Delta z) - F(z)}{\Delta z}\right\}}{3} \quad (1)$$

As understood from Expression (1), the area variation rate Si in a target grid point with coordinates x, y, and z is obtained by dividing differences between physical quantity F(x), F(y), and F(z) in the grid point and physical quantity F(x+Δx), F(y+Δy), and F(z+Δz) in a grid point at a distance Δx, Δy, and Δz from the target grid point by the distance Δx, Δy, and Δz, adding the division results, and dividing the addition results by 3.

The area variation rate Si in each grid point in this block is calculated, and the maximum value (Si, max) and minimum value (Si, min) of the area variation rate of the data associated with each of the grid points included the block are determined. The maximum value (Si, max) and minimum value (Si, min) of the area variation rate in the block are defined by Expression (2).

$$S_{i,min} = \min S_i$$

$$S_{i,max} = \min S_i \quad (2)$$

(S16) Next, a difference between the maximum value and the minimum value (Si, max−Si, min) is calculated to determine whether the difference is larger than a predetermined threshold value (Th) preset by a user. If the difference is larger than the threshold value (Th), it is determined that an area in a target block includes a portion having a large variation rate and a portion having a small variation rate in a mixed form, and the block is further divided evenly to obtain a link structure.

(S18) Next, an average (S) of area variation rates in each block is calculated by averaging area variation rates (Si) in each calculation point in each block. To elaborate, an average of area variation rates is derived from Expression (3).

$$\overline{S}_i = \frac{\sum_i^N S_i}{N} \quad (3)$$

(S20) Further, the time variation rate in each grid point is derived from Expression (4).

$$T_i = \frac{F(t+\Delta t) - F(t)}{\Delta t} \quad (4)$$

In Expression (4), a difference between physical quantity F(t) at time t and physical quantity F(t+Δt) at time (t+Δt) is calculated with respect to physical quantity F at a certain grid point, and the difference is divided by Δt to calculate the time variation rate T. Then, the average time variation rate (T) in each block is calculated by averaging the time variation rates (T) at each grid point in each block. To elaborate, the average of time variation rates is calculated based on Expression (5).

$$\overline{T}_i = \frac{\sum_i^N T_i}{N} \quad (5)$$

(S22) After the completion of calculation of an average of change rates, the ratio of area variation rate (rs) and the ratio of time variation rate (rt) in the tables 50, 51-1, 51-2, and 52 in FIG. 5 are calculated. In other words, a block having the area variation rate larger than any other blocks and a value thereof (maximum resolution) are extracted. All the data associated with the grid points arranged in the block which has the largest area variation rate is processed. The data associated with the grid points included in the other blocks is processed. The number of the grid points included in the other blocks is decided in accordance with a ratio to the largest area variation rate. As for the other blocks, a ratio of the maximum variation rate is set as an output frequency and stored in the column of an average area variation rate (rs) and a column of an average time variation rate (rt) in the tables in FIG. 5.

(S24) The number of processed areas (blocks) I is reset to "0".

(S26) It is determined whether I is larger than the total number of areas L. More specifically, whether all areas have been processed or not is determined. If I is larger than the total number of areas, the processing returns to step S10, since all of the areas have been processed.

(S28) On the other hand, if I is not larger than the total number of areas, the processing shifts to output frequency determination processing, since all of the areas have not been processed. In other words, a ratio of time variation rate (rt) in each block I on the tables 50, 51-1, 51-2, and 52 is read to determine whether or not to display calculation points in each block. Here, it is determined whether or not the output time frequency (ratio of time variation rate) rt of the block is larger than a random number (0 to 1). If rt is larger than the random number, the block is determined to be displayed at that step. If rt is not larger than the random number, the block is not displayed. Thus, the processing advances to step S32.

For example, provided that the output time frequency is "0.7", and the number of simulation steps is "10", data is output at 7 steps out of 10 steps. To select 7 steps out of 10, a random number of "0 to 1" is set at each step, and physical quantity is output at steps having a value of the output frequency larger than the random number (output frequency rt>random number of 0 to 1).

(S30) Next, at a step where data of a target block is to be output, a ratio of area variation rate in the area I is read to determine grid points data of which is to be output based on this ratio of area variation rate. For example, if a ratio of area variation rate in a certain block is "0.5", physical quantity is output at N×0.5 grid points (½ of the number of grid points in the block) relative to the number of grid points N in the block.

(S32) Then, the processing shifts to the next area (block) processing, the number of processed areas I is incremented by "1" and the processing returns to step S26.

In other words, in the block division step, the table and link structure are generated accompanying block division, and calculated time and area variation rates are set in the generated table. In addition, the calculated ratios of time and area variation rates are set in the generated table. It is determined which data is stored with reference to the data in these tables.

For that determination, whether to store physical quantity at each grid point in a block is determined based on the ratio of time variation rate in the block. Next, output data is determined based on the ratio of area variation rate.

Figure 7:
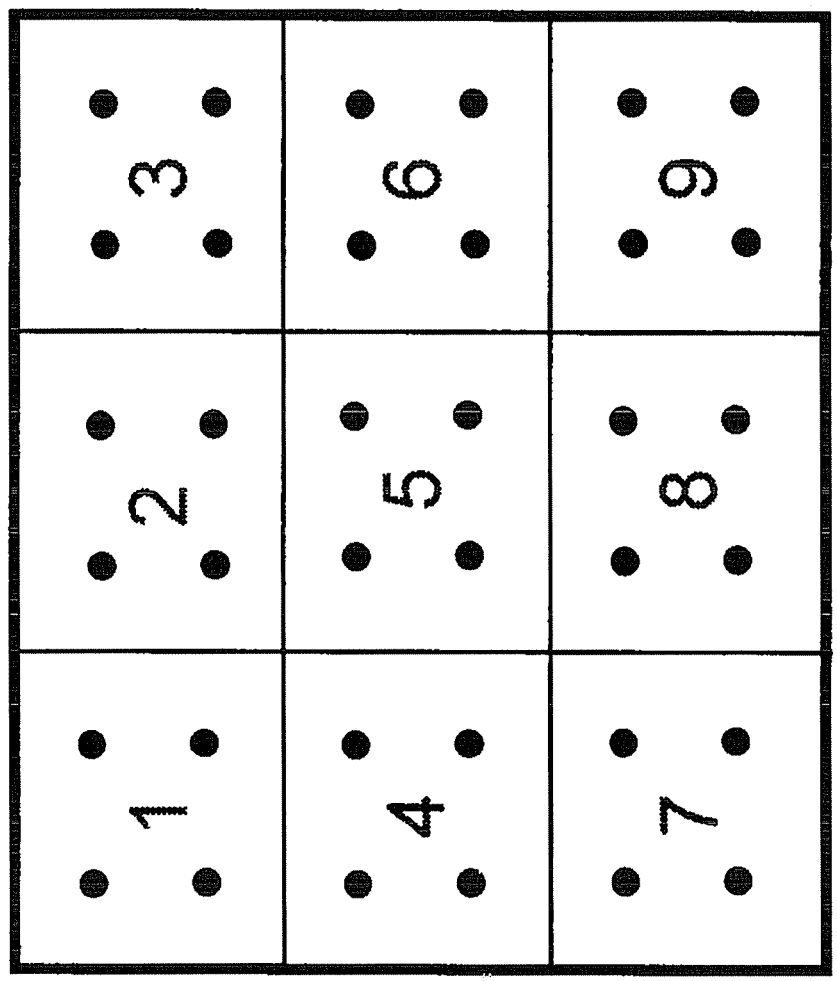
FIG. 7 is an explanatory view of block division in a first comparative example.

FIG. 7 is an explanatory view for the case of dividing a simulation area into a preset number (in this example, 9) of blocks (areas). FIG. 8 is an explanatory view of storage data in block division of the first comparative example in FIG. 7. In this example, it is assumed that each block includes four grid points. In the case of storing data (physical quantity) at every grid point as illustrated in FIG. 7, an amount of storage data is 36 (=4×9) as illustrated in FIG. 8 irrespective of the variation rate at grid points.

Figure 9:
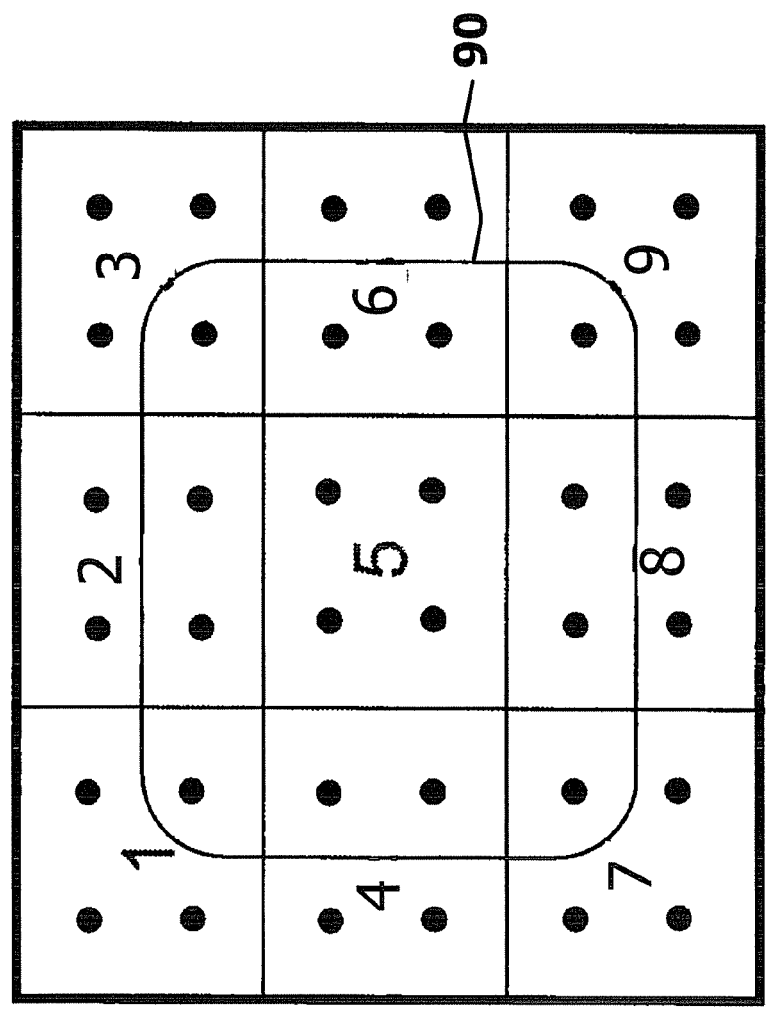
FIG. 9 is an explanatory view of block division in a second comparative example.

FIGS. 9 and 10 are explanatory views for the case of storing data in consideration of the variation rate at grid points. Similar to FIG. 7, FIG. 9 is an explanatory view for the case of dividing a simulation area into a preset number (in this embodiment, 9) of blocks (areas). A region 90 denotes a portion having a large variation rate. As illustrated in FIG. 10, if a storage frequency is determined in accordance with the average variation rate, an amount of storage data is "16". As understood from the comparison between FIGS. 7 and 8, the amount of storage data can be reduced. Hence, it is possible to store only important data having a large area variation rate as can be selected by a user based on a calculation result.

However, many grid points with a low storage frequency are included even within the region 90, and the storage frequency is not optimized.

Figure 11:
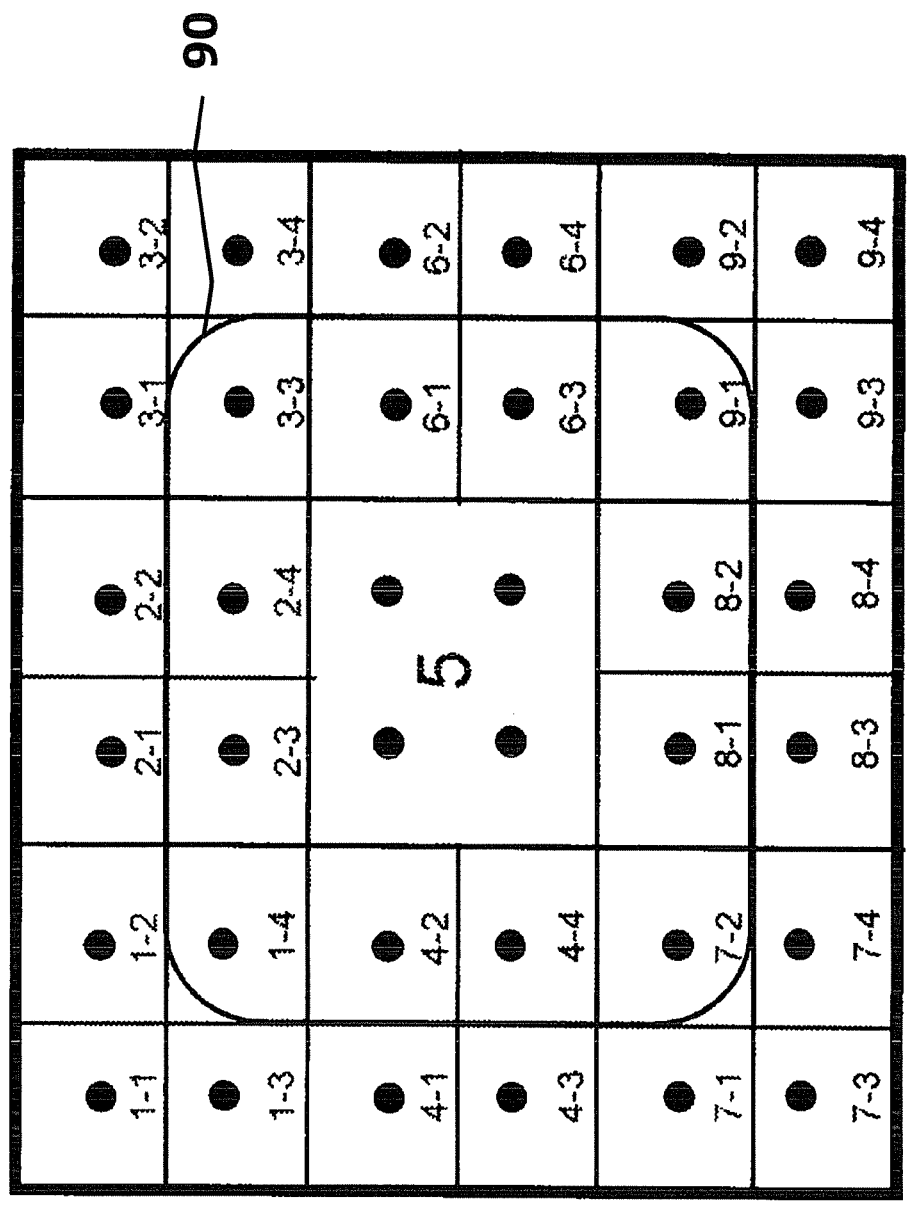
FIG. 11 is an explanatory view of block division according to an embodiment of the present invention.

FIGS. 11 and 12 show the case of dividing blocks into a smaller size and optimizing the storage frequency. FIG. 11 shows an example in which a simulation area is divided into a preset number (in this example, 9) of blocks (areas) and the blocks are further divided in accordance with the variation rate in each block.

As illustrated in FIG. 12, if the storage frequency is determined in accordance with an average variation rate, an amount of storage data is determined by physical quantity per block×storage frequency. Thus, the amount of storage data is "16", and the amount of storage data can be reduced similar to the example in FIG. 10. In addition, since each block is further divided, data at each grid point having the large variation rate included in the region 90 in FIG. 11 can be all stored. For example, blocks 1-4, 2-3, 2-4, and 3-3 are stored.

In this way, a simulation area is first uniformly divided into blocks. If grid points having the large variation rate and gird points having the small variation rate are included in the blocks in a mixed form, the blocks are further divided. The blocks are divided into proper-sized blocks, making it possible to store only important data having a large area variation rate as can be selected by a user based on a calculation result.

Further, at the time of dividing a simulation area into blocks, an average of the area variation rates in a target block is compared with an average of the area variation rates in the other blocks to determine an output frequency in consideration of a change in all of the simulation area.

Moreover, at the time of dividing a simulation area into blocks, an average of the area variation rates in a target block is compared with an average of the area variation rates in the other blocks to determine an output frequency in consideration of a change in all of the simulation area. Further, output steps on the time axis can be flexibly determined.

Furthermore, even if a physical phenomenon largely changes with time, a change in each block is examined to reconfigure area blocks at regular frequency, making it possible to store data useful for a user if a simulation is largely changed.

In the above embodiment, data processing is explained using calculation data of a simulation program, but the present invention is applicable to calculation data of computer graphics and data of consecutive moving pictures. Further, both of the area and time variation rates in each block are used to determine the output frequency. However, either one may be used therefor.

Although the present invention are described based on the embodiment, the present invention encompasses various modifications within the scope of the present invention, and these modifications are included in the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data processing method for sampling data from a plurality of sets of original data each varying over time, each of the sets of the original data being associated with each of a plurality of grid points arranged in an area, the method comprising:
   dividing the area into a plurality of blocks evenly so that each of the blocks encloses a plurality of grid points;
   calculating, executed by a computer, a variation rate of each set of the original data associated with each of the grid points included in each of the blocks;
   dividing at least one of the blocks into a plurality of sub-blocks evenly in accordance with the variation rate of said at least one of the blocks so that each of the sub-blocks encloses at least one of the grid points;
   calculating, executed by a computer, a variation rate of each set of the original data associated with each of the grid points included in each of the sub-blocks; and
   determining a frequency of sampling data associated with each of the grid points for the sub-blocks of said at least one of the blocks and for the rest of the blocks in accordance with the variation rate of the sub-blocks and said rest of the blocks.

2. The data processing method of claim 1, wherein the determining comprises:

calculating an average of an area variation rate of each set of the original data associated with each of the grid points included in each of the sub-blocks and said rest of the blocks; and determining an area frequency of sampling data in accordance with a result of comparison among the average of the area variation rate in each of the sub-blocks and said rest of the blocks.

3. The data processing method of the claim 2, wherein the determining comprises:

processing the set of original data associated with all of the grid points arranged in the block which has a largest area variation rate of all the blocks; and processing the set of original data associated with the grid points included in the other blocks, a number of the grid points being decided in accordance with a ratio to the largest area variation rate.

4. The data processing method of the claim 1, wherein the determining comprises:

calculating an average of a time variation rate of each set of the original data associated with each of the grid points included in each of the sub-blocks and said rest of the blocks; and determining a time frequency of sampling data in accordance with a result of comparison among the average of the time variation rate in each of the sub-blocks and said rest of the blocks.

5. The data processing method of the claim 4, further comprising determining time steps for processing by applying a Monte Carlo method in accordance with the determined frequency of sampling data.

6. The data processing method of the claim 1, further comprising:

initializing a condition of dividing each of the blocks in predetermined time steps; and reconfiguring the sub-blocks and said rest of the blocks.

7. The data processing method of the claim 1, wherein the dividing at least one of the blocks into a plurality of sub-blocks evenly comprises:

calculating a difference between a minimum value and a maximum value of the variation rate of each set of the original data associated with each of the grid points included in each of the blocks; and dividing the block into the sub-blocks evenly when the difference is larger than a predetermined threshold value.

8. A non-transitory computer-readable storage medium storing a computer program of sampling data from a plurality of sets of original data each varying over time, each of the sets of the original data being associated with each of a plurality of grid points arranged in an area, the program comprising the steps of:

dividing the area into a plurality of blocks evenly so that each of the blocks encloses a plurality of grid points;

calculating a variation rate of each set of the original data associated with each of the grid points included in each of the blocks;

dividing at least one of the blocks into a plurality of sub-blocks evenly in accordance with the variation rate of said at least one of the blocks so that each of the sub-blocks encloses at least one of the grid points;

calculating a variation rate of each set of the original data associated with each of the grid points included in each of the sub-blocks; and determining a frequency of sampling data associated with each of the grid points for the sub-blocks of said at least one of the blocks and for the rest of the blocks in accordance with the variation rate of the sub-blocks and said rest of the blocks.

9. The non-transitory computer-readable storage medium of claim 8, wherein the determining step comprises:

calculating an average of an area variation rate of each set of the original data associated with each of the grid points included in each of the sub-blocks and said rest of the blocks; and determining an area frequency of sampling data in accordance with a result of comparison among the average of the area variation rate in each of the sub-blocks and said rest of the blocks.

10. The non-transitory computer-readable storage medium of claim 9, wherein the determining step comprises:

processing the set of original data associated with all of the grid points arranged in the block which has a largest area variation rate of all the blocks; and processing the set of original data associated with the grid points included in the other blocks, a number of the grid points being decided in accordance with a ratio to the largest area variation rate.

11. The non-transitory computer-readable storage medium of claim 8, wherein the determining step comprises:

calculating an average of a time variation rate of each set of the original data associated with each of the grid points included in each of the sub-blocks and said rest of the blocks; and determining a time frequency of sampling data in accordance with a result of comparison among the average of the time variation rate in each of the sub-blocks and said rest of the blocks.

12. The non-transitory computer-readable storage medium of claim 11, further comprising determining time steps for processing by applying a Monte Carlo method in accordance with the determined frequency of sampling data.

13. The non-transitory computer-readable storage medium of claim 8, further comprising:

initializing a condition of dividing each of the blocks in predetermined time steps; and reconfiguring the sub-blocks and said rest of the blocks.

14. The non-transitory computer-readable storage medium of claim 8, wherein the dividing at least one of the blocks into a plurality of sub-blocks step comprises:

calculating a difference between a minimum value and a maximum value of the variation rate of each set of the original data associated with each of the grid points included in each of the blocks; and dividing the block into the sub-blocks evenly when the difference is larger than a predetermined threshold value.

15. A data processing system comprising:

calculator for calculating data each varying over time, the data being associated with each of a plurality of grid points arranged in an area; and storage device for storing the data, wherein the calculator performs a process of:

dividing the area into a plurality of blocks evenly so that each of the blocks encloses a plurality of grid points;

calculating a variation rate of each set of the original data associated with each of the grid points included in each of the blocks;

dividing at least one of the blocks into a plurality of sub-blocks evenly in accordance with the variation rate of said at least one of the blocks so that each of the sub-blocks encloses at least one of the grid points;

calculating a variation rate of each set of the original data associated with each of the grid points included in each of the sub-blocks; and determining a frequency of sampling data associated with each of the grid points for the sub-blocks of said at least one of the blocks and for the rest of the blocks in accordance with the variation rate of the sub-blocks and said rest of the blocks.

16. The data processing system of claim 15, wherein the calculator further performs a process of:

calculating an average of an area variation rate of each set of the original data associated with each of the grid points included in each of the sub-blocks and said rest of the blocks; and determining an area frequency of sampling data in accordance with a result of comparison among the average of the area variation rate in each of the sub-blocks and said rest of the blocks.

17. The data processing system of claim 15, wherein the calculator further performs a process of:

calculating an average of a time variation rate of each set of the original data associated with each of the grid points included in each of the sub-blocks and said rest of the blocks; and determining a time frequency of sampling data in accordance with a result of comparison among the average of the time variation rate in each of the sub-blocks and said rest of the blocks.

18. The data processing system of claim 15, wherein the calculator further performs a process of determining time steps for processing by applying a Monte Carlo method in accordance with the determined frequency of sampling data.

19. The data processing system of claim 15, wherein the calculator further performs a process of:

initializing a condition of dividing each of the blocks in predetermined time steps; and reconfiguring the sub-blocks and said rest of the blocks.

20. The data processing system of claim 15, wherein the calculator further performs a process of:

calculating a difference between a minimum value and a maximum value of the variation rate of each set of the original data associated with each of the grid points included in each of the blocks; and dividing the block into the sub-blocks evenly when the difference is larger than a predetermined threshold value.

* * * * *